United States Patent Office 2,787,603
Patented Apr. 2, 1957

2,787,603
AQUEOUS COATING COMPOSITIONS AND SUBSTRATES COATED THEREWITH

Philip F. Sanders, Lima, Pa., assignor to E. I. du Pont de Nemours and Company, Wilmington, Del., a corporation of Delaware No Drawing. Application July 23, 1953,
Serial No. 369,969

18 Claims. (Cl. 260—29.3)

This invention relates to aqueous coating compositions, particularly to aqueous dispersed acrylic interpolymer coatings, still more particularly to metallic and non-metallic substrates coated with the aqueous dispersions, still more particularly to electrical wires coated with the aqueous dispersions and process of making same.

Many varieties of prior art coating compositions have been used as insulation on magnet wire to be used in the manufacture of core wound electrical devices such as armatures, electromagnets, relays, coils and the like. The coatings are generally deposited from a solution of the film forming components in volatile organic solvents.

The solution type wire coatings have the disadvantage of the presence of volatile organic solvents, which are sometimes noxious, and are costly vehicles. Solvent recovery systems to salvage the volatile solvents allay the cost in part. Another disadvantage is that the viscosity of the coating varies significantly with the amount of dissolved film former and application characteristics necessitate applying the coating at low solids with many coats. For example, six or more coats are often required to deposit a 1 mil film on wire.

The aqueous dispersion coatings of this invention avoid the disadvantages of the solution type coating composition by use of water as the predominating component of the volatile vehicle and permits use of higher molecular weight polymers than is possible with organic solutions of the polymer.

Suitable candidates for coating of magnet wire, in addition to having the necessary electrical properties, must be flexible, tough, hard, abrasion resistant, resistant to heat shock and heat aging, solvent resistant, and must be applicable at conventional coating speeds such as 10 to 40 feet per minute without the need for abnormal baking temperatures.

The primary object of this invention is the provision of a coating composition dispersed in an aqueous medium. A further object is to provide coatings having desirable electrical insulating properties. A still further object is the provision of a wire enamel composition which, when applied to a wire and cured, results in a coalesced, flexible, tough, hard, abrasion resistant, heat resistant and solvent resistant coating. These and other important objects will become readily apparent as the description of the invention proceeds.

These objects are accomplished by blending an aqueous dispersion of an acrylic interpolymer, described hereinafter, with an aqueous dispersion or solution of a heat-reactive aldehyde condensation resin, such as, e. g. phenol/formaldehyde, urea/formaldehyde, urea-melamine formaldehyde and melamine/formaldehyde resins. The modified interpolymer dispersions are applied to a suitable substrate and heated to coalesce and cure the coating. The acrylic interpolymers employed in the compositions of this invention are derived from a polymerizable mixture of (A) acrylonitrile, (B) alpha-olefinic monocarboxylic acid selected from the group consisting of acrylic acid, methacrylic acid, ethacrylic acid, phenyl acrylic acid and crotonic acid and (C) an ester of said alpha-olefinic monocarboxylic acids with a saturated aliphatic monohydric alcohol of 1 to 8 carbon atoms, the monomers being present in certain critical proportions. Throughout the specification and claims the term "alkyl acrylate" is used generically to designate the esters of acrylic acid and the esters of alpha or beta substituted acrylic acids.

The acrylic interpolymers per se employed in the coating compositions are described and claimed in a copending application, Serial No. 369,890, filed July 23, 1953, by James J. Sanderson.

The invention is illustrated but is not limited to the following examples in which the parts and percentages are expressed on a weight basis.

EXAMPLE I

A wire enamel was prepared in accordance with the following formula:

| | Percent by weight |
|---|---|
| Aqueous dispersion of interpolymer A (35.6% solids) | 81.4 |
| Aqueous dispersion of heat reactive phenol/formaldehyde resin (33% solids) | 4.6 |
| Aqueous ammonium hydroxide (28% $NH_3$) (to pH value of about 9.4) | 1.8 |
| Water | 12.2 |
| | 100.0 |
| Total non-volatile_____percent__ | 30.5 |

The interpolymer A was prepared by emulsion polymerization from the following polymerization charge:

| | Parts by weight |
|---|---|
| Water | 200.0 |
| Sodium bisulfite | 0.1 |
| Sodium "Lorol" sulfate | 0.5 |
| Polymerizable monomers: | |
|     Acrylonitrile | 63.0 |
|     Butyl acrylate | 32.0 |
|     Methacrylic acid | 5.0 |
| Potassium persulfate | 0.3 |

The polymerization reaction was carried out under an atmosphere of an inert gas, such as, e. g. nitrogen, in a suitable polymerization vessel equipped with stirrer, reflux column, thermometer and inert gas inlet. The water was deoxygenated by refluxing for about 15 minutes under the atmosphere of nitrogen and cooled to about 150° F. before adding the polymerizable monomers. The dispersing agent was added to the deoxygenated water along with the sodium bisulfite, after which the mixture of polymerizable monomers was added followed by addition of potassium persulfate as an aqueous solution. The aqueous polymerization charge was maintained at about 140° F. for about 2 hours or until the polymerization reaction was complete. Although the preferred polymerization temperature is about 140° F., the polymerization may be carried out at room temperature or as high as the refluxing temperature of the polymerization charge. After the polymerization reaction had run to completion the heated aqueous interpolymer dispersions were freed of residual monomers by blowing with air, which also removed some of the water thereby concentrating the dispersion.

The water dilutable phenol/formaldehyde resin is commercially available as "Bakelite" BR15100 at 66% solids in an aqueous medium. The ratio of phenol/formaldehyde resin to the interpolymer on a dry basis is 5:95.

The above wire enamel composition was applied in four coats to #25 copper magnet wire at a rate of about 10 feet per minute by repeatedly passing it upwardly through a column of the aqueous coating composition. Pre-wetting the wire before each coat with a 1% aqueous solution of a wetting agent, such as, e. g., sodium "Lorol" sulfate facilitated the deposition of the wire enamel composition. After each successive coat the coated wire was passed through an oven having an air temperature of about 500-600° F. and of such length that the exposure of the coated wire to the high heat was about 20 seconds.

The physical properties of the coated wire are summarized in Table I.

EXAMPLE II

A wire enamel was prepared in accordance with the following formula:

| | Percent by weight |
|---|---|
| Aqueous dispersion of interpolymer B (36.3% solids) | 76.0 |
| Aqueous dispersion heat reactive phenol/formaldehyde resin BR15100 (33% solids) | 4.4 |
| 50% aqueous solution of tetramethylene sulfone | 16.6 |
| Aqueous ammonium hydroxide (28% NH₃) (to pH value of about 9.3) | 3.0 |
| | 100.0 |
| Total non-volatile percent | 29.1 |

The tetramethylene sulfone was present in amount of 30% of the interpolymer and it served as a coalescing agent to facilitate in the film formation.

The interpolymer B was derived from the following polymerization charge:

| | Parts by weight |
|---|---|
| Water | 200.0 |
| Sodium bisulfite | 0.1 |
| Sodium "Lorol" sulfate | 0.5 |
| Polymerizable monomers: | |
| Acrylonitrile | 68.0 |
| Butyl acrylate | 27.0 |
| Methacrylic acid | 5.0 |
| Potassium persulfate | 0.3 |

The interpolymer B was prepared in the same manner as described for the preparation of interpolymer A.

The wire enamel composition was applied to #25 copper magnet wire in the same manner as described in Example I.

The physical properties are listed in Table I.

EXAMPLE III

A wire enamel was prepared in accordance with the following formula:

| | Percent by weight |
|---|---|
| Aqueous dispersion of interpolymer C (36.3% solids) | 77.3 |
| Aqueous dispersion of heat reactive phenol/formaldehyde resin BR15100 (33% solids) | 4.5 |
| Aqueous ammonium hydroxide (28% NH₃) (to pH value of about 9.0) | 1.3 |
| 50% aqueous solution of cyclic ethylene carbonate | 16.9 |
| | 100.0 |
| Total non-volatile percent | 29.6 |

The interpolymer C was prepared from the following polymerization charge:

| | Parts by weight |
|---|---|
| Water | 200.0 |
| Sodium bisulfite | 0.1 |
| Sodium "Lorol" sulfate | 0.5 |
| Polymerizable monomers: | |
| Acrylonitrile | 73.0 |
| Butyl acrylate | 22.0 |
| Methacrylic acid | 5.0 |
| Potassium persulfate | 0.3 |

The interpolymer C was prepared in the same manner as described for interploymer A.

The wire enamel composition of Example III was applied to #25 copper magnet wire in the same manner as described for Example I. The physical properties of the insulated wire are given in Table I.

EXAMPLE IV

A wire enamel was prepared in accordance with the following formula:

| | Percent by weight |
|---|---|
| Aqueous dispersion of interpolymer D (35.3% solids) | 54.4 |
| Aqueous dispersion of heat reactive phenol/formaldehyde resin BR15100 (33.0% solids) | 31.4 |
| Aqueous ammonium hydroxide (28% NH₃) (to pH value of about 9.0) | 2.2 |
| Water | 12.0 |
| | 100.0 |
| Total non-volatile percent | 29.6 |

The interpolymer D was prepared from the following polymerization charge:

| | Parts by weight |
|---|---|
| Water | 200.0 |
| Sodium bisulfite | 0.1 |
| Sodium "Lorol" sulfate | 0.5 |
| Polymerizable monomers: | |
| Acrylonitrile | 30.0 |
| Butyl acrylate | 65.0 |
| Methacrylic acid | 5.0 |
| Potassium persulfate | 0.3 |

The interpolymerization reaction was carried out in accordance with the procedure given in Example I. A #25 copper magnet wire was coated with the wire enamel composition of Example IV in the same manner as described in Example I. The coated wire had the physical properties shown in Table I.

The physical properties listed in Table I were determined in accordance with the following test procedures:

Cut-through temperature was determined by forming the coated wire into two separate U bends and placing one on top of the other at right angles to make contact at four points, placing the wire assembly between flat machined metal plate surfaces under a load of 1000 grams with the metal plates immersed in a Woods metal alloy

Table I

| | Example I | Example II | Example III | Example IV |
|---|---|---|---|---|
| Film Thickness, Mils | 1.1 | 1.05 | 1.05 | 1.05. |
| Cut-Through Temp., °F | 420 | 369 | 352 | 400. |
| Scrape-Abrasion Resistance, Strokes | 52 | 47 | 46 | 4. |
| Insulation Resistance, Wet, Megohms | >20,000 | >20,000 | >20,000 | 9,000. |
| Quick Snap/WOD | OK—No Cracks | OK—No Cracks | OK—No Cracks | OK—No Cracks. |
| Heat Shock | do | do | do | Do. |
| Dielectric Breakdown, Volts/Mil of Coating Thickness. | 3,870 | 4,050 | 3,760 | |
| Flexibility Retention on Aging at 257° F., Hours Exposure Before Cracking is Encountered. | 1,730 | 800 | 500 | |
| Solvent Resistance in Boiling Mixture of Equal Volumes of Ethyl Alcohol and Toluene. | Insoluble | Insoluble | Insoluble | Insoluble. | bath for heat transfer, and increasing the temperature of the alloy bath until the wire cuts through the insulation to complete an electrical circuit by shorting.

Scrape abrasion or abrasion resistance of the enamel was measured by using a General Electric scrape abrasion tester which involves dragging a 0.016 inch diameter needle under a load of 440 grams back and forth at a 90° angle in a horizontal plane over the enameled wire with the cylindrical surface of the needle in contact with the test surface.

Insulation resistance was measured with a General Electric insulation resistance meter having a scale reading to 20,000 megohms. Two strands of the coated wire were twisted together and soaked for 24 hours in distilled water prior to testing.

The test designated as "Quick Snap-WOD" was carried out by giving the wire a quick snap to elongate it to the breaking point, after which the wire was wound around its own circumference and examined for cracks.

Heat shock was determined by elongating the wire to the breaking point by a quick snap and then by winding the wire around its own circumference, heating it for one hour at 125° C. under this condition, after which the coating was examined for cracks.

The dielectric breakdown test was carried out by tightly twisting two coated wires together and measuring the voltage necessary to short through the insulation of the two twisted wires.

Flexibility retention on heat aging was determined by storing loose coils or coated wire in a 257° F. oven, removing samples from time to time, winding them around their own circumference and thereafter examining them for cracking.

Solvent resistance of the insulation was determined by immersing coated wire in boiling mixture of equal volumes of toluene and ethyl alcohol for one hour.

EXAMPLE V

The wire enamel composition of Example I was diluted from 30.5% non-volatile content with water to 22.0%. A woven glass fabric having the following specifications:

| | |
|---|---|
| Weight | 1.43 oz./sq. yd. |
| Thread count | Warp 60 x filler 47 (threads per inch). |
| Thickness | 2 mils. |
| Yarn size | 900½. | was given two dip coats with the diluted composition referred to above at the rate of one yard per minute. After each successive dip coat the material was passed through a heat zone about 7 feet long having air temperature of about 400° F.

Approximately 1.7 ounces per square yard of dry coating was uniformly deposited by the two dip coats.

The coated glass fabric had the following physical properties:

| | |
|---|---|
| Thickness | 3.8 mils. |
| Coating weight | 1.7 oz./sq. yd. |
| Dielectric strength (¼" electrode short time test) | 1135/volts/mil of coating thickness. |
| Elmendorf tear (scale readings) | Warp 7/filler 5. |
| Grab tensile strength | Warp 163/filler 145. |

The coated glass fabric was particularly suitable for electrical insulation.

The acrylic interpolymers useful in the practice of this invention are derived from mixtures of the following monomeric polymerizable components, the composition of which varies within the ranges indicated below:

| | Parts by weight |
|---|---|
| Acrylonitrile | 30 to 80 |
| Alpha-olefinic monocarboxylic acid | 2 to 15 |
| Alkyl acrylate | 15 to 65 | for a total of 100 parts of the polymerizable mixture. For use in wire enamels the following ranges are preferred:

| | Parts by weight |
|---|---|
| Acrylonitrile | 55 to 80 |
| Alpha-olefinic monocarboxylic acid | 2 to 10 |
| Alkyl acrylate | 18 to 35 | for a total of 100 parts of the polymerizable mixture.

In the specific Examples I–IV the coating compositions of this invention are applied directly on the wire. It is sometimes desirable to apply the coating compositions of this invention over ceramic and vitreous coated wires disclosed in U. S. Patents 2,421,652, 2,393,068, 2,386,634 and 2,327,462.

The examples illustrate the use of methacrylic acid. In place of methacrylic acid other alpha-olefinic monocarboxylic acids may be used in like amount, namely, acrylic acid, ethacrylic acid, phenyl acrylic acid and crotonic acid. However, methacrylic acid is particularly preferred because of its polymerization rate.

In addition to the butyl acrylate shown in the examples, it is to be understood that other esters of the aforementioned alpha-olefinic monocarboxylic acids with saturated aliphatic monohydric alcohols of 1 to 8 carbon atoms may be used, such as, e. g. the methyl, ethyl, propyl, isopropyl, butyl, isobutyl, amyl, hexyl, 2-ethyl butyl, cyclohexyl, heptyl and octyl alcohols.

The heat-reactive aldehyde resin diminishes the thermoplasticity of the cured coating composition and thereby improves the resistance to cut-through at elevated temperatures. In Examples I–III the phenol/formaldehyde resin represents 5% of the combined weight of the interpolymer and the phenol/formaldehyde. As little as 2% of heat-reactive aldehyde resin, same weight basis, imparts a useful improvement in cut-through resistance. For other uses where flexibility is not as critical as in the case of wire coatings, such as, e. g., can coatings and metal primers, the hardening agent may be as high as 40% based on the weight of coating solids. For wire enamels the preferred range for the heat-reactive aldehyde resin is from about 5% to 20%, based on the weight of the coating solids. In place of the phenol aldehyde resins in the examples other heat hardenable water dilutable aldehyde resins may be used, such as, e. g. urea/formaldehyde, urea-melamine/formaldehyde and melamine/formaldehyde resins.

The coating compositions of Examples I, II, and III call for a solvent for the interpolymer which acts as a coalescing agent upon drying of the composition. Tetramethylene sulfone and cyclic ethylene carbonate are used in these examples. The presence of coalescing agents cause the aqueous dispersions to be less critical to application conditions. However, presence of a coalescing agent is not essential to satisfactory application of the coating compositions when sufficient heat is employed to bring about coalescence. The coating compositions containing the interpolymers in which the acrylonitrile is the predominating component generally do not satisfactorily coalesce on air drying at moderate temperatures; hence it is desirable to employ an agent to facilitate coalescence of such coatings. For other applications where drying is carried out at room temperature or under moderate heat (200–250° F.) the coalescing agent may be present in an amount up to 150% by weight of the interpolymer. Other examples of water soluble coalescing agents which may be employed include dimethyl formamide, dimethyl acetamide, alkyl monoethers of ethylene glycol or diethylene glycol and diacetone alcohol.

The compositions of this invention may be further modified with cross-linking agents which are polyfunctional and capable of reacting with the carboxyl group of the interploymer. Examples of such cross-linking agents include glycerine, diamines, polyvinyl alcohol, vinyl cyclohexane diepoxide, epoxy polyether resin such as derived from bisphenol and epichlorohydrin, and imidobispropylamine.

In the specific formulae for the polymerization reactions sodium "Lorol" sulfate is the dispersing agent for the interpolymer. Other dispersing agents used in emulsion polymerization may be used in place thereof since the invention does not depend on any particular dispersing agent. The amount of dispersing agent may vary between 0.25% and 4%, based on the weight of polymerizable monomers, the preferred content is about .5%. All of the wetting agent may be added to the polymerization charge or part may be added to the aqueous dispersions of the interpolymer.

The redox (reduction/oxidation) polymerization initiator combination, in the specific examples, is illustrated as being sodium bisulfite and potassium persulfate in the ratio of 1:3. This ratio may vary from 1:1 to 1:10. The amount of redox combination may vary as is well known by those skilled in the art. Other redox combinations can be used in place of the sulfite/persulfate combination. Other conventional polymerization initiators may be used, such as, e. g., inorganic peroxides, organic peroxides, salts of inorganic peroxides and azo nitrile catalysts.

It will be readily apparent that the coating compositions of this invention may be further modified by the addition of plasticizers, stabilizers, pigments and extenders.

The interpolymer aqueous dispersions as produced generally have a pH in the range of about 3.5 to 5.5 Although these dispersions may be formulated into coating compositions under this acidic condition, better coalescing results and smoother films are obtained when the dispersions are applied at a pH value in the range of 7–10 and preferably at a pH of about 9.0 when using ammonium hydroxide to provide the alkalinity. In place of ammonium hydroxide other alkaline materials which do not form strong electrolytes may be used to adjust the pH to an alkaline condition, such as, e. g., monoethanol amine, triethanol amine and n-butyl amine.

Many modifications and different embodiments of this invention may be made without departing from the spirit and scope thereof and it is to be understood that the invention is not limited to the specific embodiments disclosed except as defined in the appended claims.

I claim:

1. A heat-cured coating composition comprising an interpolymer of monomers consisting of (A) 30 to 80 parts of acrylonitrile, (B) 2 to 15 parts of an alpha-olefinic monocarboxylic acid selected from the group consisting of acrylic acid, methacrylic acid, ethacrylic acid, phenyl acrylic acid and crotonic acid, and (C) 15 to 65 parts of an ester of said alpha-olefinic monocarboxylic acids with a saturated aliphatic monohydric alcohol of 1 to 8 carbon atoms for a total of 100 parts by weight and a water-dilutable heat-reactive aldehyde condensation resin selected from the group consisting of phenol/formaldehyde resin, urea/formaldehyde resin, urea-melamine/formaldehyde resin and melamine/formaldehyde resin said coating composition being insoluble in a boiling mixture of equal volumes of ethyl alcohol and toluene.

2. A heat-cured coating composition comprising an interpolymer of monomers consisting of (A) 55 to 80 parts of acrylonitrile, (B) 2 to 10 parts of an alpha-olefinic monocarboxylic acid selected from the group consisting of acrylic acid, methacrylic acid, ethacrylic acid, phenyl acrylic acid and crotonic acid, and (C) 18 to 35 parts of an ester of said alpha-olefinic monocarboxylic acids with a saturated aliphatic monohydric alcohol of 1 to 8 carbon atoms for a total of 100 parts by weight and a water-dilutable heat-reactive aldehyde condensation resin selected from the group consisting of phenol/formaldehyde resin, urea/formaldehyde resin, urea-melamine/formaldehyde resin and melamine/formaldehyde resin said coating composition being insoluble in a boiling mixture of equal volumes of ethyl alcohol and toluene.

3. The product of claim 1 in which the heat-reactive aldehyde condensation resin is present in an amount corresponding to 2% to 40%, based on the total weight of the said interpolymer resin and said aldehyde resin.

4. The product of claim 1 in which the heat-reactive aldehyde condensation resin is present in an amount corresponding to 5% to 20%, based on the total weight of said interpolymer resin and said aldehyde resin.

5. The product of claim 1 in which the heat-reactive aldehyde condensation resin is phenol/formaldehyde resin.

6. The product of claim 1 in which the component (B) is methacrylic acid.

7. The product of claim 1 in which the component (C) is butyl acrylate.

8. The product of claim 1 in which the interpolymer is a ternary polymer of acrylonitrile, methacrylic acid and butyl acrylate.

9. A coating composition comprising an aqueous dispersion of an interpolymer of monomers consisting of (A) 30 to 80 parts of acrylonitrile, (B) 2 to 15 parts of an alpha-olefinic monocarboxylic acid selected from the group consisting of acrylic acid, methacrylic acid, ethacrylic acid, phenyl acrylic acid and crotonic acid, and (C) 15 to 65 parts of an ester of said alpha-olefinic monocarboxylic acids with a saturated aliphatic monohydric alcohol of 1 to 8 carbon atoms, for a total of 100 parts by weight, and a water dilutable heat-reactive aldehyde condensation resin selected from the group consisting of phenol/formaldehyde resin, urea/formaldehyde resin, urea-melamine/formaldehyde resin, and melamine/formaldehyde resin.

10. The product of claim 9 in which the heat-reactive aldehyde condensation resin is present in an amount corresponding to 2% to 40%, based on the total weight of said interpolymer resin and said aldehyde resin.

11. The product of claim 10 in which the aldehyde resin is a water dilutable and heat-reactive phenol/formaldehyde resin.

12. The product of claim 9 in which the interpolymer is a ternary polymer of acrylonitrile, methacrylic acid and butyl acrylate.

13. A substrate having a coalesced coating of the composition of claim 1.

14. A wire having a coalesced coating of the composition of claim 1.

15. A metal sheet having a coalesced coating of the composition of claim 1.

16. A glass fabric having a coalesced coating of the composition of claim 1.

17. Process of preparing a coating composition which comprises subjecting to polymerizing conditions a mixture of polymerizable monomers in an aqueous medium, said mixture consisting of (A) 30 to 80 parts of acrylonitrile, (B) 2 to 15 parts of an alpha-olefinic monocarboxylic acid selected from the group consisting of acrylic acid, methacrylic acid, ethacrylic acid, phenyl acrylic acid and crotonic acid, and (C) 15 to 65 parts of an ester of said alpha-olefinic monocarboxylic acids with a saturated aliphatic monohydric alcohol of 1 to 8 carbon atoms for a total of 100 parts by weight of said mixture to form an aqueous dispersion of a ternary interpolymer, blending said aqueous dispersion with a water dilutable heat-reactive aldehyde condensation resin selected from the class consisting of phenol/formaldehyde resin, urea/formaldehyde resin, urea-melamine/formaldehyde resin and melamine/formaldehyde resin, said aldehyde condensation resin being present in an amount corresponding to 2% to 40%, based on the total weight of the aldehyde condensation resin and the interpolymer resin.

18. The process of coating wire which comprises applying the composition of claim 9 to a wire, heating to coalesce and cure said coating composition.

References Cited in the file of this patent

UNITED STATES PATENTS

| 1,933,052 | Finkentscher et al. | Oct. 31, 1933 |
| 2,191,581 | Nowak et al. | Feb. 27, 1940 |
| 2,557,266 | Dittmar et al. | June 19, 1951 |

FOREIGN PATENTS

| 411,860 | Great Britain | June 13, 1934 |